March 15, 1966    E. C. RHYNE, JR    3,241,035
A.C.-D.C. REGULATED POWER SUPPLY
Filed Jan. 26, 1962
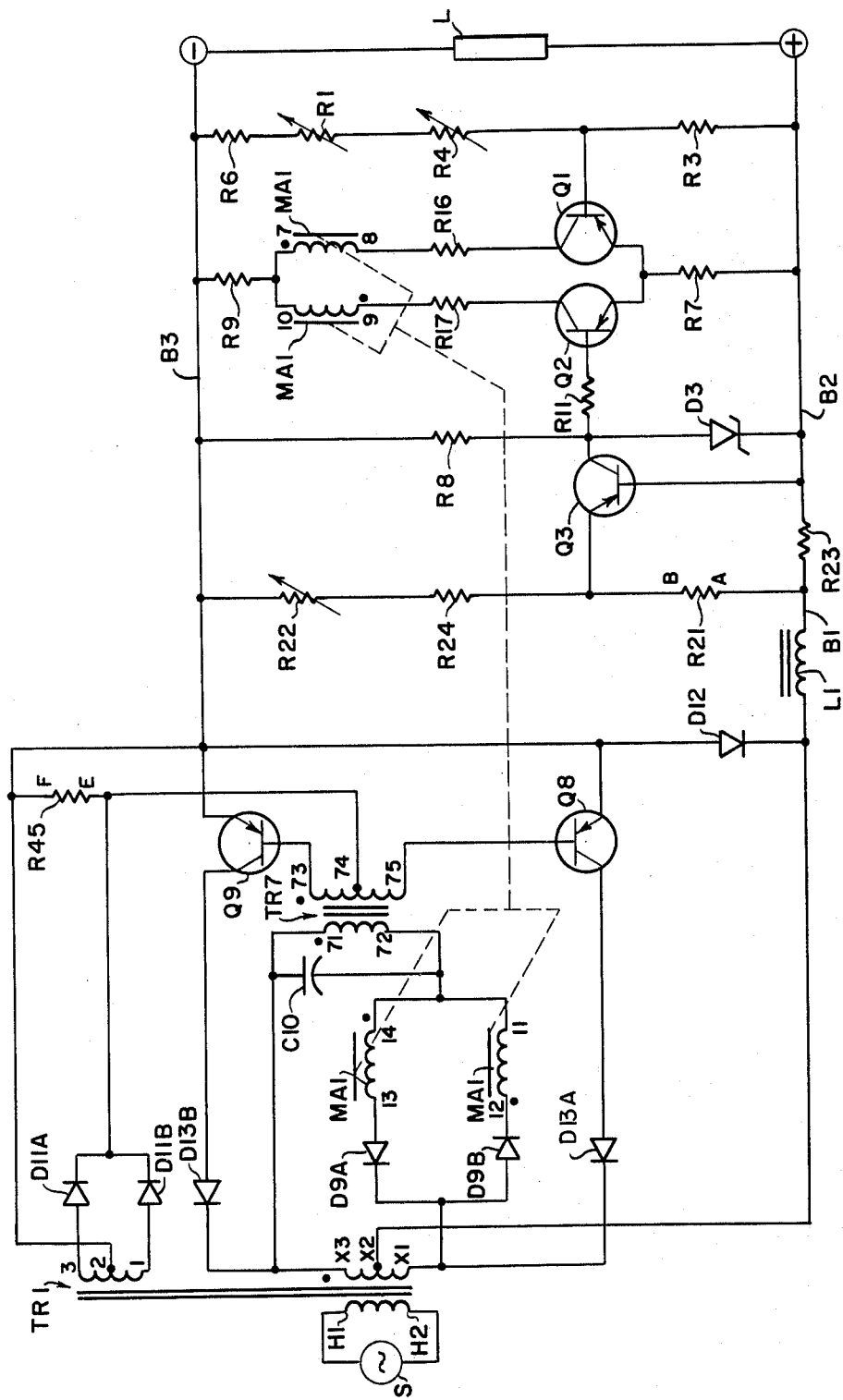

3,241,035
A.C.-D.C. REGULATED POWER SUPPLY
Earl C. Rhyne, Jr., Millis, Mass., assignor to The Warren Manufacturing Company, Inc., Littleton, Mass., a corporation of Massachusetts
Filed Jan. 26, 1962, Ser. No. 168,982
3 Claims. (Cl. 321—18)

My invention relates to regulated power supplies and particularly to a direct-current regulated power supply which is energized from an alternating-current source and employs transistors and magnetic amplifiers as control elements.

In known regulated power supplies, it is necessary to use expensive high-power transistors or silicon controlled rectifiers, or large high power magnetic amplifiers. The expense and/or bulk of the resulting equipment compares unfavorably with the power output and regulating abilities of the power supply.

An object of my invention is to obviate these disadvantages and to provide a regulated power supply having a circuit employing low cost transistors and comparatively small magnetic amplifiers while at the same time providing an output comparable to larger and/or more expensive power supplies.

Another object of my invention is to provide a regulated power supply which includes considerably simpler control circuits than have hitherto been used to obtain comparable outputs.

In accordance with a feature of my invention, I provide in a power supply voltage input means and voltage output means adapted for respective connection to an alternating-current source and a load to be energized, variable conductance transistor means connected intermediate the input means and the output means for regulation of the voltage across the load and including rectifier means, and magnetic amplifier means having an input connected to the output means and an output connected to the transistor means for regulating the conductance of the transistor means and hence the load voltage.

The foregoing and other objects and advantages of the invention, as well as the essential features by virtue of which they are achieved, will be apparent from and will be set forth in the following description in conjunction with the accompanying drawing wherein there is exemplified a regulated power supply which embodies the various features of the invention.

Referring to the drawing, my invention serves for rectifying and regulating the alternating voltage from a source S which energizes a load L. An isolating power transformer TR1 includes a primary winding H1, H2 connecting across the terminals of the source S, a transistor-biasing-supply secondary winding 1, 3 with a center tap 2, and a power-transformer secondary winding X1, X3 with a center tap X2. A pair of diodes D13A and D13B together with the transformer secondary X1, X3 electrically form a full-wave center-tap rectifier arrangement to energize the load L.

During a first half-cycle, a circuitory path is electrically traceable from the center-tap X2 through a filter choke L1 to a lead B1 through a current-measuring resistor R23 to a positive lead B2, through the load L to a negative lead B3, to the emitter-collector circuit of the transistor Q9, and through the power-rectifier diode D13B to the winding end X3. On the succeeding half-cycle, a circuitory path exists from the center tap X2 to the filter choke L1, to the lead B1, through the current-measuring resistor R23, to the positive lead B2, through the load L through the negative lead B3, through the emitter-collector path of the transistor Q8 and through the power-rectifier diode D13A back to the secondary end X1. During the first half-cycle, current flow through transistor Q8 is blocked by the power-rectifier diode D13A and during the second half-cycle current flow through transistor Q9 is blocked by diode D13B.

The series connection of the emitter-collector circuits in transistors Q8 and Q9 between the respective ends X1, X3 of transformer TR1 and the load enables convenient electronic control of the voltage appearing between the leads B2 and B3 during each conducting half-cycle. The bases of transistors Q8 and Q9 receive an off or positive 0 to 5 volt bias relative to their respective emitters from a voltage derived across a resistor R45. The latter is connected by one end F to the emitters and by the other end E to a center tap 74 of a winding 73, 75 on a transformer TR7, the winding ends 73 and 75 connecting respectively to the bases of transistors Q9 and Q8. A full wave rectifier including winding 1, 3 of transformer TR1, and diodes D11A, D11B rectifies the alternating voltage from primary winding H1, H2 and impresses a positive voltage at end E and a negative voltage at end F of resistor R45. The transistors Q8 and Q9 thus remain non-conductive until an appropriate voltage appears across the primary winding 71, 72 of transformer TR7.

The primary winding 71, 72 of transformer TR7 receives a transistor "turn on" voltage from the winding X1, X3 by way of an intermediate magnetic amplifier MA1. This "turn on" voltage is sufficient to switch the transistor completely on (i.e. to saturation). The magnetic amplifier MA1 possesses a saturable core surrounded by two control windings 7, 8 and 9, 10 and two variable impedance windings 11, 12 and 13, 14. The winding 71, 72 receives alternating-current during one half-cycle from the winding ends X1, X3 of transformer TR1 by way of the magnetic-amplifier operating winding 13, 14 and a series connected diode D9A. During the other half-cycle, winding 71, 72 receives current from winding X1, X3 by way of winding 11, 12 and a series connected diode D9B, poled oppositely to diode D9A. Each diode D9A and D9B prevents current flow through its respective branch during conduction by the other diode.

One effect of these currents in windings 11, 12 and 13, 14 is to abruptly saturate the magnetic amplifier MA1 at a particular phase angle once during each half cycle. Prior to saturation in each half cycle, the impedance of windings 11, 12 and 13, 14 is high and most of the voltage at winding X1, X3 is impressed thereacross. After saturation, the windings 11, 12 and 13, 14, impedance lowers and the voltage is abruptly impressed across winding 71, 72 of transformer TR7 for the remainder of the half-cycle. The phase angle at which saturation occurs, that is to say the saturation angle, varies with the flux induced by the windings 7, 8 and 9, 10. The latter are so arranged that equal currents through both effectively cancel each other and a saturation angle of, for example 60° obtains. If the current through winding 7, 8 increases relative to the current in 9, 10, the saturation angle is greater than 60°. It is less than 60° for an opposite current relationship in windings 7, 8 and 9.

The voltage at the secondary winding of transformer TR7 is phased to coincide with the polarity of the voltage at transformer winding X1, X3 so that when the potential at end X3 is negative the potential at end 73 is negative. The dots at the windings X1, X3 and 73, 75 indicate this in conformance with the standards of the American Institute of Electrical Engineers.

Thus, a negative voltage at one end of the secondary winding 73, 75 in transformer TR7 can bias on the transistors Q8 or Q9, only during the half-cycle which the transistor would normally be allowed to conduct by the rectifiers D13A, D13B. To illustrate, during the half-cycle of A.-C. voltage in which end X3 in transformer TR1 is negative relative to X2 and X2 is negative relative to X1, diode D13A prevents current flow through transistor Q8. At the same time, the voltage across ends X3, X2 renders the voltage of the emitter in PNP transistor Q9 positive relative to the collector. However, if no voltage appears on the winding 73, 75 of transformer TR7, the voltage from E to F across resistor R45, from base-to-emitter in transistor Q9, is positive and holds off transistor Q9. Magnetic amplifier MA1 prevents voltage from appearing across transformer TR7 until the magnetic amplifier core abruptly saturates as determined by the operation of transistor circuits incorporating transistors Q1 and Q2. Firing of magnetic amplifier MA1 allows the voltage at winding X1, X3 to abruptly produce at the winding 75, 73 a voltage sufficient to saturate transistor Q9 immediately.

On the opposite half-cycle, the polarities are such as to reverse the functions of transistors Q8 and Q9, and the voltages hold transistor Q8 off until the magnetic amplifier fires. Firing turns transistor Q8 on hard by combination of voltages produced in transformer winding 73, 75 of transformer TR7 and the voltage across resistor R45.

A voltage sensing and regulating circuit including transistors Q1, Q2, and resistors R1, R4, R6, R3, R7, R11, R8 and R9 controls the currents through windings 7, 8 and 9, 10 in the magnetic amplifier MA1 in response to the voltage between the leads B2 and B3. The transistors Q1 and Q2 each possesses the usual emitter, base and collector and function as a differential amplifier. An emitter resistor R7 connects the emitters of both transistors Q1 and Q2 to the lead B2. Collector resistors R16 and R17 effectively minimize the dissipation in transistors Q1 and Q2 and connect the collectors of transistors Q1 and Q2 respectively to one end of a negative resistor R9 by way of control windings 7, 8 and 9, 10 respectively of magnetic amplifier MA1. The ends 7 and 10 of the control windings 7, 8 and 9, 10 connect together and pass current to the lead B3 by way of the resistor R9. A voltage divider, comprising series-connected resistors R6, R1, R4 and R3 across the leads B2 and B3, provides, at the junction of resistors R3 and R4, emitter-base current for transistor Q1. A resistor R8 and a Zener diode D3 connected in series across the leads B2 and B3 form a constant potential junction relative to lead B2 at their meeting point. A temperature-compensating resistor R11 connects this constant potential junction to the base of transistor Q2.

Another voltage divider connects across leads B1 and B3 and possesses variable setting resistor R22, resistor R24 in series therewith, and resistor R21. A transistor Q3 possesses an emitter-collector circuit wherein the collector connects to the constant potential junction of diodes D3, and the emitter connects to the junction of the resistors R24 and R21. The transistor Q3 also includes a base which connects to the lead B2.

The circuit operates as follows. A particular voltage level for a particular load requires that the transistors Q8 and Q9 conduct for a particular portion of their respective half-cycles in each phase. Accordingly, it is necessary that the magnetic amplifier windings 11, 12 and 13, 14 permit the winding X1, X3 to impress across winding 71 and 72 and winding 73, 75 a base biasing voltage such as to permit conduction of the diodes over this preset desired angle within each half-cycle; that is to say, a particular desired voltage for a particular load requires a particular saturation angle of the magnetic amplifier MA1. The saturation angle of the magnetic amplifier depends upon the difference in current in the windings 7, 8 and 9, 10; equal currents in these two windings producing, for example, a saturation angle of 60°. The saturation angle is therefore also dependent upon the relationship of the voltages of the bases of transistors Q1 and Q2. Accordingly, for a particualr saturation angle to maintain the current of the load voltage it is necessary that a particular relationship of base voltage exist at transistors Q1 and Q2. This relationship is maintained by the constant voltage across Zener diode D3 and the load-proportional voltage across the resistor R3. The voltage relationship is not maintained if, for example, the load voltage and hence the voltage across resistor R3 increases above the predetermined desired value. As a result of such an increase the voltage at the base of transistor Q1 becomes more negative and the current through the winding 7, 8 increases with an accompanying decrease in current through the winding 9, 10. The saturation angle is thereby increased, that is to say the period of time during which the transistors Q8 and Q9 are capable of conducting within each half-cycle by virtue of the voltage impressed from the winding X1 and X3 to the windings 72, 71 and 73, 75, is decreased. A compensating decrease in voltage across the load results therefrom. This shifts the voltage relationship at the bases of transistors Q1 and Q2 until an equilibrium prevails.

When the load voltage decreases below the desired value, meaning that the saturation angle is too great, the voltage at transistor Q1 becomes more positive relative to the voltage of transistor Q2, effecting a decrease in current through winding 7, 8 and an increase in current through winding 9, 10. There results a decrease in the saturation angle in windings 11, 12 and 13, 14 so that the voltage is impressed across winding 71, 72 by winding X1, X3 over a longer time period within each half-cycle. Accordingly, this voltage renders the emitter-collector circuits of the transistors Q8 and Q9 conductive over a longer time within each half-cycle so as to increase the load voltage back to the desired level.

The capacitor C10 across winding 1, 2 of transformer TR7 supports the normal exciting current required by the cores of magnetic amplifier MA1 and prevents voltage from appearing across the secondary of the transformer TR7 until the magnetic amplifier fires. A diode D12 across the secondary of transformer center tap X2 and the lead B3 permits load current to flow to the heavy inductance L1 while transistors Q8 or Q9 are not conductive. The current then passes through the diode D12 and prevents large inductive voltages from appearing across the regulating transistors.

Thus, this circuit provides a fixed output voltage using transistors as the power control devices rather than either silicon controlled rectifiers or heavy power magnetic amplifiers. The magnetic amplifier used for controlling the transistors Q8 and Q9 possesses very much smaller dimensions than power magnetic amplifiers which would otherwise be required in a direct-current control. Furthermore, in the configuration described the power transistors require much simpler control circuits than comparable silicon controlled rectifiers. Where germanium power transistors are used, the cost of transistors is much less than the cost of comparable silicon controlled rectifiers.

The winding 1, 3 of transformer TR1 which provides the D.-C. voltage across resistor R45 permits the transistors Q8 and Q9 to hold off much higher voltages than normal before being turned on. The winding 1, 3 and the resistor R45 supply a reverse, "off" base current for the transistors Q8 and Q9 of such magnitude that the off emitter-collector circuit can withstand many times the voltages which could otherwise be tolerated by the transistors with either their bases connected to the emitters or with no base voltage applied to the transistor. Therefore the circuit permits use of less expensive transistors to control high voltage circuits.

The above description refers to control of voltage in the power supply. However, the current flow through transistors Q8 and Q9 possesses a permissible maximum which should not be exceeded.

The previously described circuit in conjunction with transistor Q3, which has hitherto been ignored, serves to prevent this excess current flow through the transistors. When no current flows through the load circuit the resistor R23 presents a voltage drop which is essentially zero. Under such conditions the base of transistor Q3 essentially possesses the voltage of point A in resistor R21. The value of resistor R21 establishes a potential at the emitter of transistor Q3 by way of the voltage divider, of which the resistor R21 is part, approximately one volt negative with respect to the lead B1. Accordingly, the base of transistor Q3 at low load current possesses a potential which is one volt positive with respect to the emitter. Under this condition transistor Q3 is held off hard thereby having little if any influence on the operation of Zener diode D3.

Load-current flow through resistor R23 develops across this resistor a negative voltage on the side D of resistor R23. The voltage between the base of transistor Q3 and the emitter equals the combined voltages across resistors R23 and R21 which in this case are subtractive. Accordingly when the voltage across resistor R23 equals the voltage across R21, i.e. the voltage across resistor R23 has a value of one volt, transistor Q3 carries a zero base voltage with respect to its emitter.

For a load current slightly larger than this value, transistor Q3 turns on and conductively diverts part of the current which normally energizes the Zener diode through the emitter-collector circuit of transistor Q3. When almost all or a sufficient amount of the current through diode D3 passes through transistor Q3 the voltage across Zener diode D3 characteristically declines. Since this voltage across diode D3 carries the reference voltage continuously determining the direct load voltage the latter declines as a consequence, and compensates for the effect of increases in current. The above effect prevents the condition of high voltage and high current which endangers the components of the load as well as the power supply.

It will be obvious to those skilled in the art upon study of this disclosure that my invention is amenable to a variety of modifications with respect to circuitry and circuit components and may be used for other purposes without departing from the essential features of my invention and within the scope of the claims annexed hereto.

I claim:
1. A regulated power supply for energization of a load by an alternating current source comprising voltage input means adapted for connection to said source, voltage output means adapted for connection to the load, rectifier means between said input and output means for supplying the load with direct current, controllable transistor means connected intermediate said input means and said output means and in series with said rectifier means for regulation of the voltage across the load, voltage means to normally bias said transistor means off, magnetic amplifier means adapted when fired to turn said transistor means on, a differential amplifier connected to respond to said output means and connected to said magnetic amplifier means to fire said magnetic amplifier means once during each half-cycle of current flow through said rectifier means, whereby when the output voltage varies from a predetermined value the firing time of said magnetic amplifier means is altered to compensatingly vary the output voltage, and constant potential means in said differential amplifier for establishing the predetermined voltage value.

2. A regulated power supply for energization of a load by an alternating current source comprising voltage input means adapted for connection to said source, voltage output means adapted for connection to the load, rectifier means between said input and output means for supplying the load with direct current, variable-conductance controllable transistor means connected intermediate said input means and said output means and in series with said rectifier means for regulation of the voltage across the load, voltage means to bias said transistor means off, self-saturable magnetic amplifier means connected to carry an alternating signal voltage from said input means and adapted when fired to apply said voltage to the base of said transistor means, a differential amplifier connected to said output means to respond to increase in a voltage of said output means above a predetermined value by conducting one way and conducting in another way in response to decreases of the voltage of said output means below the predetermined value, windings in said magnetic amplifier means connected to said differential amplifier for firing said magnetic amplifier means once each half-cycle in response to conduction in said differential amplifier in the respective ways, constant potential means connected to said differential amplifier for establishing the predetermined voltage value, and overload transistor means responsive to the current passing through said output means when said output means connects to a load and connected to said constant potential means for varying the constant potential effected thereby so as to vary the voltage supplied by said output means to the load in response to the current to the load.

3. A supply as in claim 2, wherein said differential amplifier includes a pair of transistor members having respective emitters and collectors and bases, a common emitter resistor in said differential amplifier, and wherein said constant potential means include a constant potential diode connected from one of said bases to said common emitter resistor.

References Cited by the Examiner
UNITED STATES PATENTS

| | | | |
|---|---|---|---|
| 2,733,395 | 1/1956 | Brown | 321—40 X |
| 2,963,637 | 12/1960 | Osborn | 323—22 |
| 3,046,469 | 7/1962 | Young | 323—22 |
| 3,072,837 | 1/1963 | Hakimoglu | 321—18 |
| 3,139,575 | 6/1964 | Brown | 321—18 |

LLOYD McCOLLUM, *Primary Examiner.*